United States Patent
Willistein (10) Patent No.: US 9,407,000 B1
(45) Date of Patent: Aug. 2, 2016

(54) ANTENNA DEPLOYMENT METHOD AND SYSTEM

(71) Applicant: HARRIS CORPORATION, Melbourne, FL (US)

(72) Inventor: Benjamin J. Willistein, Bloomfield, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 14/713,413

(22) Filed: May 15, 2015

(51) Int. Cl.
  *H04M 1/00* (2006.01)
  *H01Q 1/30* (2006.01)
  *H04B 1/3827* (2015.01)

(52) U.S. Cl.
  CPC .............. *H01Q 1/30* (2013.01); *H04B 1/3827* (2013.01)

(58) Field of Classification Search
  CPC ................................ H01Q 1/30; H04B 1/3827
  USPC ................... 455/575.7; 342/25 A, 25 C, 126; 343/802
  See application file for complete search history.

(56) References Cited

U.S. PATENT DOCUMENTS

| | | | |
|---|---|---|---|
| 5,779,190 A | 7/1998 | Rambo et al. | |
| 6,219,004 B1 | 4/2001 | Johnson | |
| 6,774,860 B2 | 8/2004 | Downs | |
| 7,237,750 B2 | 7/2007 | Chiu et al. | |
| 7,302,316 B2 | 11/2007 | Beard et al. | |
| 7,764,229 B2 | 7/2010 | Smoot et al. | |
| 2007/0057845 A1 | 3/2007 | Miura | |
| 2014/0099853 A1 | 4/2014 | Condon et al. | |
| 2014/0152507 A1* | 6/2014 | McAllister | H01Q 11/08 342/126 |
| 2014/0218239 A1 | 8/2014 | Sharawi et al. | |
| 2015/0102972 A1* | 4/2015 | Scire-Scappuzzo | H01Q 9/16 343/802 |
| 2016/0131757 A1* | 5/2016 | Duncan | H01Q 1/288 342/25 C |

FOREIGN PATENT DOCUMENTS

EP    2131443 A1    12/2009

* cited by examiner

*Primary Examiner* — Amancio Gonzalez
(74) *Attorney, Agent, or Firm* — Fox Rothschild LLP; Robert J. Sacco; Carol E. Thorstad-Forsyth (57) ABSTRACT

Method for deploying an antenna involves selectively determining an optimal position for at least one defining point of an antenna based on one or more parameters associated with a wireless communication session. Responsive to this determining, an unmanned aerial vehicle is automatically controlled to suspend at least one portion of the antenna aloft in a controlled position based on the optimal position. The antenna is coupled to a wireless communication device which is disposed on the ground. The method involves using the antenna while aloft to conducting the wireless communication session while the wireless communication device is disposed on the ground.

25 Claims, 8 Drawing Sheets

ANTENNA DEPLOYMENT METHOD AND SYSTEM

BACKGROUND OF THE INVENTION

1. Statement of the Technical Field

The inventive arrangements relate to antennas for radio communication equipment, and more particularly to rapidly deployable antennas used in high frequency radio communication systems.

2. Description of the Related Art

It is well known that HF frequencies present a key advantage to operators in a field environment, giving them the ability to achieve beyond-line-of-sight communications using the ionosphere, without depending on satellite availability or repeater infrastructure. However, depending on multiple variables including the current solar cycle, time of day, time of year, and distance and global position of desired communication link, only certain frequencies may be available to use. Particularly in the case of low-HF frequencies, antennas with good radiating performance tend to be physically very long, and for satisfactory performance may need to be elevated to a height that is difficult, inconvenient, and/or time-consuming to achieve by conventional means. In fact, in many scenarios Low-HF (<10 MHz) frequencies may be the only practical option available to support communications. For example, this is often the case during periods of low solar cycle activity, or at certain hours of the day. Also, if the desired distance for a communication link is in the 30-500 mile range, the lower end of the HF frequencies can be the only ones usable for operations in a near vertical incidence sky-wave (NVIS) mode.

Due to the long wavelengths, low-HF resonant dipole antennas are physically large and take time to deploy. Accordingly, antennas suitable for these types of communications present challenges to a field operator who is on the move. This can be especially true when the maximum usable frequency is less than 4 MHz. In such scenarios, the length of a resonant dipole becomes greater than 120 feet long, and a reasonable height above ground for efficient operation can be a minimum of 20 or 30 feet high.

In order to accommodate such antennas, telescoping masts and guy wires are often needed to achieve the required heights above ground for an antenna to be adequately efficient. Another often used method is to use trees, buildings, fences, or other tall-standing existing supports as they can be found in the field. Most cases require the use of an automatic antenna tuner to accommodate electrical lengths that are not resonant. This has an associated amount of loss in signal power.

To set up a reliable HF antenna that is usable in the low-HF frequencies of below 4 MHz is often time consuming to deploy, and to take down, and may contribute to a tactical decision to not take the time to set it up at all in the first place. If UHF and VHF communications are not possible due to non-line of sight, and HF equipment is not utilized, SATCOM channels are usually used, which are expensive, limited, and available bandwidth and channels are shared by many users.

SUMMARY OF THE INVENTION

Embodiments of the invention concern a method for deploying an antenna. The method involves determining at least one antenna characteristic that is desirable for a radio frequency communication session. Based on the at least one antenna characteristic, an optimal is determined position for at least one defining point of at least one conductive radiating element. The conductive radiating element comprises a portion of an antenna which is electrically coupled to a wireless communication device. An unmanned aerial vehicle is used to carry aloft at least a portion of the conductive radiating element to a controlled position above ground. Thereafter, a radio frequency communication session can be conducted while the conductive radiating element is suspended in the air by the UAV, and while the wireless communication device is disposed on the ground.

According to another aspect, the method for deploying an antenna involves selectively determining an optimal position for at least one defining point of an antenna based on one or more parameters associated with a wireless communication session. Responsive to this determining, an unmanned aerial vehicle is automatically controlled to suspend at least one portion of the antenna aloft in a controlled position based on the optimal position. The antenna is coupled to a wireless communication device which is disposed on the ground. The method involves using the antenna while aloft to conducting the wireless communication session while the wireless communication device is disposed on the ground.

According to a further aspect, a radio transceiver system includes a wireless communication device and an antenna for the wireless communication device. The antenna includes at least one conductive radiating element. An antenna feed line connects the wireless communication device to the at least one conductive radiating element. An antenna deployment control unit coupled to the wireless communication device automatically determines based on at least one communication parameter associated with the wireless communication session, an optimal position for at least one defining point of the at least one conductive radiating element. Thereafter, the control unit selectively controls an unmanned aerial vehicle to carry aloft at least a portion of the conductive radiating element to a controlled position above ground based on the optimal position.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Current methods of providing HF antennas for use by field operators can be effective in many circumstances, but are usually time consuming to deploy. Moreover, existing antenna systems often make a tradeoff as between "good" performance (on any one frequency or in a particular direction of propagation) versus flexibility of use. In this regard, a particular antenna design may provide sub-optimal performance for any one particular communication scenario. This reduced performance is accepted as a compromise to accommodate operations on a broader number of frequencies, transmission directions, and required take-off angles of propagation to achieve communications to a multiple number of intended receivers.

According to one aspect of the inventive arrangements, one or more micro-unmanned aerial vehicles (UAVs) with hovering capability are utilized to deploy, tune, and optimize an antenna for highest signal strength in a desired direction. For example, in a basic configuration shown in FIG. 1, a single UAV 102 can physically carry aloft one or more portions of a conductive radiator element 104. The conductive radiator element is part of an antenna 106. The UAV will position one or more defining points of the antenna at a particular height h above ground 101 in accordance with commands received from an antenna deployment control unit (ADCU) 128. The conductive radiating element in this example can be a vertical conductive wire or rod. Accordingly, a defining point of the antenna may correspond to one or both of the terminal ends 120, 122.

A terminal end fixture is advantageously provided at the terminal ends 120, 122. According to one aspect, the terminal end fixture 116 can be an insulator to which the conductive radiator element 104 is attached. The terminal end fixture 124 can be a connector for coupling the antenna to an antenna feed line 114. The feed line 114 can be any suitable RF transmission line, including for example, a coaxial cable. A halyard line 118 and the terminal end fixture 116 can be used to support the antenna 104 aloft beneath the UAV In the scenario shown in FIG. 1, the position of the antenna (e.g. as defined by its height h) can be selected by the ADCU to achieve a particular communication goal. For example, consider the case of a communication session relying upon a line of sight communication link (e.g. a communication mode using a frequency in the UHF or VHF frequency band). The height h in such scenario can be selected to facilitate line of sight communication between wireless communication device 110 and a remote wireless communication device 112.

Figure 1:
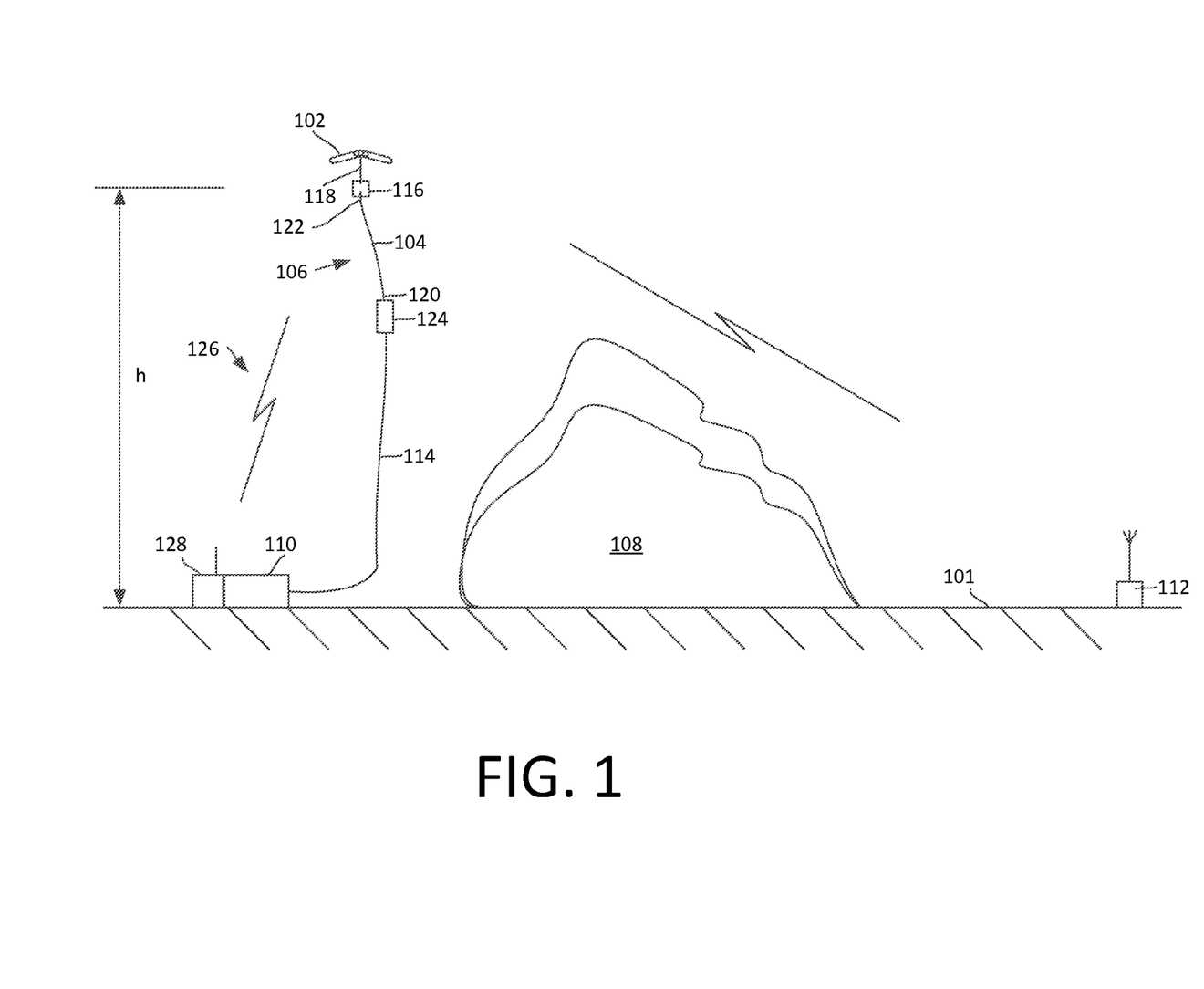
FIG. 1 is a drawing of first embodiment of an antenna deployment system for a monopole antenna that is useful for understanding the inventive arrangements.

For example, the height h may be selected to achieve line-of-sight over an obstacle 108, such as a building, or a mountainous terrain, so that the antenna has direct line of sight communication with a remote wireless communication device 112. Alternatively, if remote wireless communication device 112 is a jammer or an interfering station, the position of the antenna 106 can be selected to help reduce interference. This can be accomplished by positioning the antenna so that the obstacle 108 is between the antenna 106 and the wireless communication device 112, thereby reducing the strength of signals received from the interfering station.

Control over the antenna position can be affected by means of a communication link 126 between the UAV and the ADCU. A wireless communication link can be used for this purpose, but in some scenarios it may be preferred to instead use the antenna feed line 104 to effect a wired communication to the UAV. The ADCU can be coupled to the wireless communication device 110 for receiving information concerning one or more communication parameters associated with a wireless communication session. The ADCU uses this information to determine the optimal characteristics of the antenna 106. In the event that a different communication mode is subsequently selected at wireless communication device 110 for a subsequent communication session, it can be desirable to change one or more characteristics associated with the antenna. For example, it may be desirable to change the height of the antenna above ground or the electrical length of the antenna. In such a scenario, the ADCU can cause the UAV to change its position (e.g. its height) to suit the particular communication scenario. Height can be controlled by simply varying the height of the UAV.

If the electrical length of the antenna is to be controlled, a wire reel can be provided at one of the terminal fixtures to facilitate varying the length of the conductive radiator 104. For example, a terminal end fixture 116 can include a wire reel under the control of the UAV which can facilitate dispensing or retraction of wire comprising the conductive radiating element 104. For example, an electric motor can be used to dispense and retract wire from the reel. In such a scenario, the ADCU can control the UAV and the wire reel to achieve the antenna position and electrical length to facilitate a particular communication session.

Figure 2:
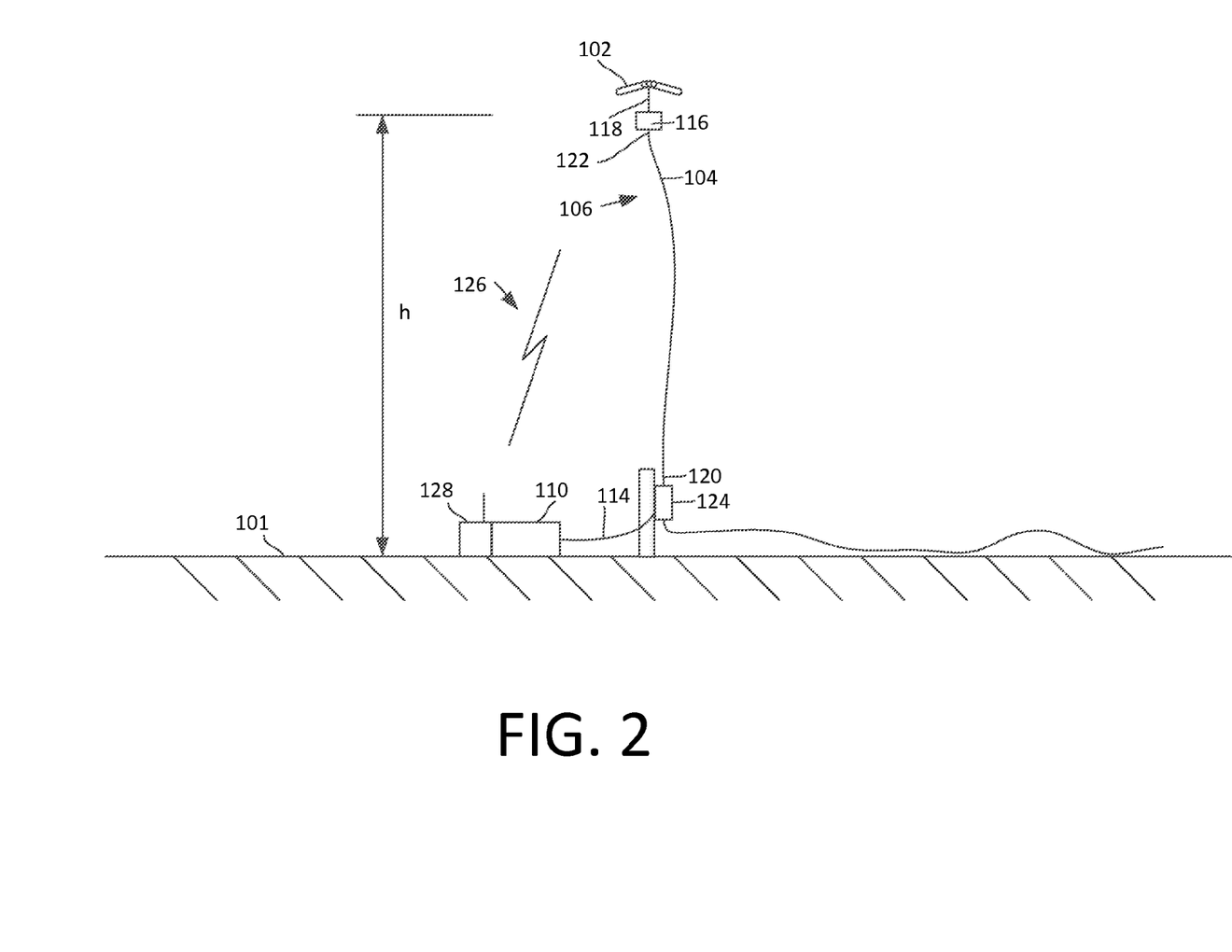
FIG. 2 is a drawing of second embodiment of an antenna deployment system for a monopole antenna that is useful for understanding the inventive arrangements.

In an alternative embodiment shown in FIG. 2, a terminal end fixture 124 can include a wire reel which has a spring member that is arranged to automatically allow wire comprising the conductive radiator element 104 to dispense from the reel in response to tension exerted by the UAV 102. The wire reel can be further arranged so that when tension upon the conductive radiator element is reduced or removed, the wire reel automatically retracts any excess portions of the wire. In such a scenario, simply varying the height of the UAV can facilitate a variation in the length of the conductive radiator element 104. The antenna shown in FIG. 2 is essentially a ground mounted vertical antenna of variable length. Accordingly, a counterpoise wire can be connected to the antenna feed line 114 and may be disposed on the ground to facilitate proper operation of the antenna.

From the discussion thus far it will be understood that the invention concerns a method for deploying an antenna wherein at least one antenna characteristic that is desirable for a radio frequency communication session is determined by the ADCU. Thereafter, based on the at least one antenna characteristic, the ADCU determines an optimal position for at least one defining point of at least one conductive radiating element comprising the antenna. Thereafter, the antenna is carried aloft by the UAV so that at least a portion of the conductive radiating element is suspended in a controlled position above ground based on the optimal position. The optimal position can be the same as the controlled position, but the two may be different in some scenarios due to practical considerations. As a practical matter, the UAV may be spaced apart somewhat from the defining points of the antenna due to halyard lengths and so on and this could affect the exact location of the radiating elements. Control limitations with respect to the UAV may also prevent the defining points of the antenna from residing exactly in the optimal position. Practical limitations such as the length of an antenna feed line may also prevent the antenna from being carried aloft past a certain height or altitude. In such scenarios, the controlled position may be a compromise between the optimal solution and the practical limits of the equipment. Further, in some scenarios, weather conditions (such as high winds) may dictate that an antenna should be maintained at a lower altitude to facilitate improved positional accuracy.

According to one aspect of the invention the ADCU automatically controls the UAV to establish and maintain the antenna in a controlled position after the optimal position has been determined. Over time, in response to a changing communication environment, or a changing set of communication parameters associated with a communication session, the ADCU may determine that it is advantageous to change one or more characteristics of the antenna configuration. When this occurs, the ADCU can automatically identify a second optimal position responsive to such changes. Thereafter, the ADCU can be configured automatically dynamically control the UAV to vary its position to move defining points of the antenna to a second controlled position based on the second optimal position. As communication conditions continue to change, the ADCU can continually identify new preferred antenna characteristics and will cause the UAV to move to new positions that help to achieve or approximate those antenna characteristics which are desired. In this regard, the ADCU can continuously automatically determine one or more desirable antenna characteristic based on one or more communication session parameters associated with the radio frequency communication session, and control the UAV accordingly.

According to a further aspect of the invention, the antenna deployed with one or more UAVs as described herein can be a dipole antenna, which may be resonant on one or more frequencies to be used for a wireless communication session. The deployment, tuning and optimizing functions of the dipole antenna could be performed by deploying one or more micro-UAVs to support one or more defining points of the dipole antenna. For example, the defining points could include one or more of a midpoint where two conductive radiating elements are attached to a center insulator, and two opposing ends of the conductive radiating elements which are displaced some distance from the center insulator.

Figure 3:
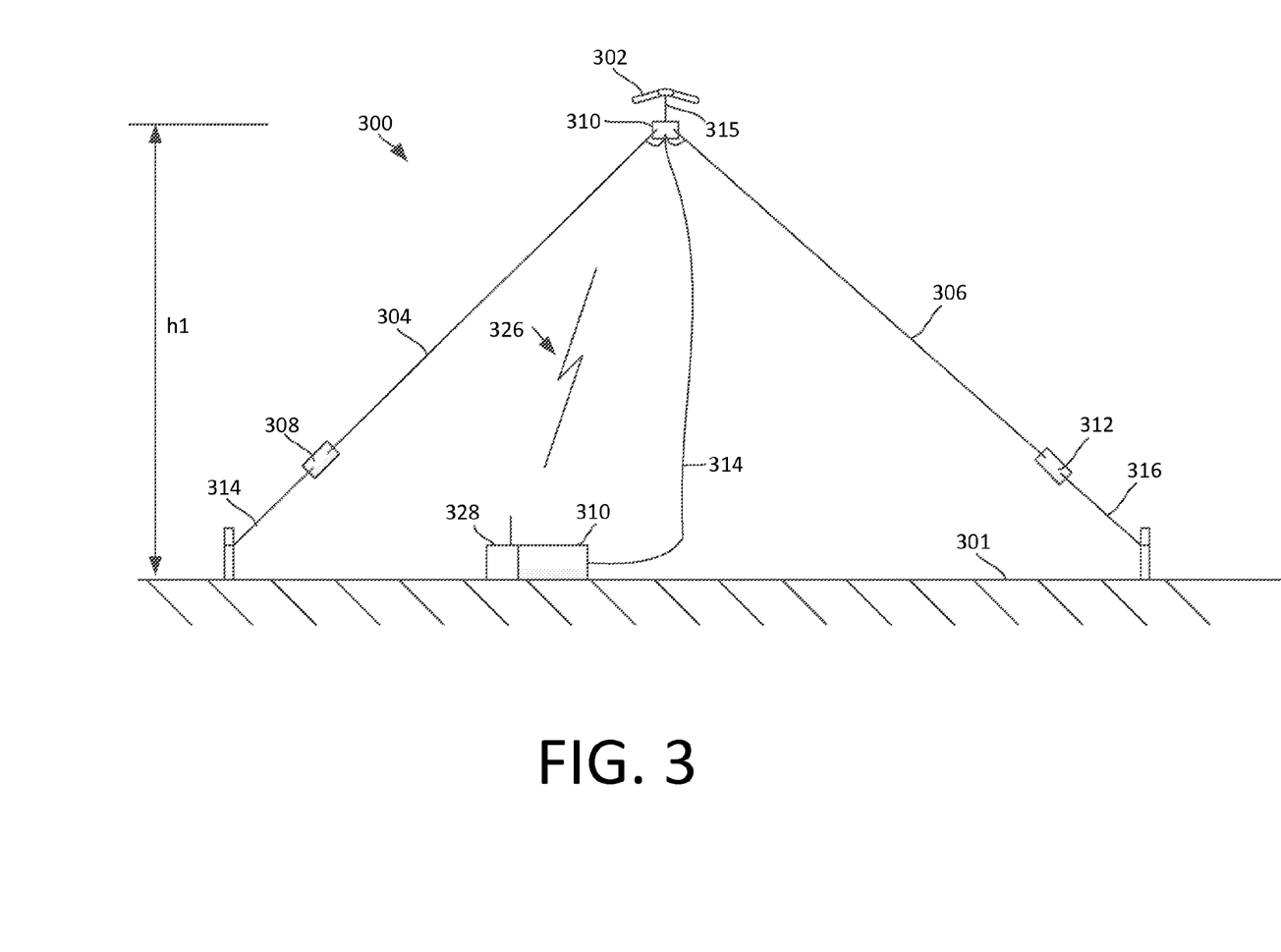
FIG. 3 is a drawing of third embodiment of an antenna deployment system for a dipole in an inverted V configuration that is useful for understanding the inventive arrangements.

Referring now to FIG. 3, there is shown a dipole antenna 300 arranged in an inverted V configuration. The antenna is supported at its midpoint fixture 310 by UAV 302. Terminal end fixtures 308, 312 are secured to the ground by means of halyards 314, 316 respectively. According to one aspect of the invention, the midpoint fixture 310 and the terminal end fixtures can each be comprised of a dielectric insulator. Accordingly, the terminal end fixtures electrically isolate each of two radiator elements 304, 306 from the halyards and the ground 301. The midpoint fixture 310 electrically isolates the radiating element 304 from radiating element 306. An antenna feed line 314 is secured to the midpoint fixture 310. The conductors of the antenna feed line 314 are connected at one end to the radiator elements 304, 306 and at an opposing end to a wireless communication device 310. An ADCU 328 is provided for controlling the operation of the UAV 302. The ADCU communicates with the UAV by means of a communication link 326. The ADCU can be communicatively coupled to the wireless communication device 310 for receiving one or more communication parameters associated with a communication session.

In the scenario shown in FIG. 3, the position of the midpoint fixture 310 (e.g. as defined by its height h1 and position relative to the terminal end fixtures) can be automatically selected by the ADCU 128 to achieve a particular communication goal. The position of the midpoint fixture can be selected to provide an antenna with one or more desired antenna characteristics. For example, by controlling the height of the midpoint fixture, many different characteristics of the antenna can be readily adjusted. In such a scenario, it is also important that the spacing between the terminal end fixtures 308, 312, and the geographic alignment of the two radiator elements (as defined by the position of the terminal ends) be chosen in advance to facilitate such antenna characteristics. Likewise, the length of each halyard 314, 316 can be chosen to determine a height of each terminal end fixture 308, 312 when the midpoint fixture is carried aloft by the UAV. Using the techniques described herein the antenna characteristic which can be dynamically changed by varying the position of the midpoint fixture can include an antenna impedance, elevation direction of maximum gain, and elevation direction of maximum null. One or more of these characteristics can be optimized for a particular communication scenario based on a height of the midpoint fixture above ground, and its position relative to each of the terminal end fixtures.

Further, if wire dispensing reels are provided at one or more of the midpoint fixture 310 and terminal fixtures 308, 312 then the electrical length characteristic of the antenna can also be adjusted. For example, the electrical length of the antenna can be tuned or adjusted to control an input impedance of the antenna. It will be appreciated that an ability to control antenna input impedance in this way will advantageously allow tuning of the voltage standing wave ratio (VSWR) for the antenna at various different operating frequencies. In such a scenario, the use of an antenna tuner can be potentially eliminated by tuning the antenna for a relatively low VSWR, thereby facilitating more efficient operation and lower power consumption.

Further, changing the electrical length of a dipole antenna can produce predictable nulls and lobes in an azimuth antenna pattern of a dipole antenna. Accordingly, this feature can be used to null interfering signals and maximize received signal strength for signals of interest. Of course, changing the electrical length of the dipole antenna can also change its input impedance and an antenna tuner may be necessary in such scenarios to facilitate use of the antenna a frequencies on which the antenna is not resonant.

If the electrical length of the antenna 300 is to be controlled, one or more wire dispensing reels can be provided at the midpoint fixtures 310 to facilitate varying the length of the conductive radiators 308, 312. According to one embodiment, each wire reel can have a spring member that is arranged to automatically allow wire comprising the conductive radiator element 304, 306 to retractably dispense from the reel at the midpoint fixture in response to tension exerted on the conductive radiator element by the UAV 302. Such tension is exerted by the UAV upon the conductive radiator elements by exerting an upward force on the midpoint fixture 310, directly or through a halyard 315. The wire dispensing reels associated with midpoint fixture 310 can be further arranged so that when tension upon the conductive radiator elements 304, 306 is reduced or removed, the wire reel automatically retracts excess portions of the wire. In such a scenario, simply varying the height of the UAV 302 can facilitate a variation in the length of each conductive radiator element 304, 306. In an alternative embodiment, the two wire reels can be disposed at terminal fixtures 308, 312 respectively, instead of at the midpoint fixture to reduce the amount of weight carried by the UAV 302.

Instead of a spring tension method of retractably dispensing the conductive radiating element, the wire reels can be motorized and under the control of the UAV and/or ADCU. For example, an electric motor can be used to dispense and retract wire from each reel. In such a scenario, the ADCU can control the UAV and the wire reel to achieve the antenna position and electrical length needed to facilitate a particular communication session. Control over each wire dispensing wheel can be provided by the UAV in response to control signals from the ADCU. To this end, a wired or wireless control link can be provided between the UAV and the motors associated with the wire reels. According to one aspect, the wire reels can be synchronized to dispense equivalent lengths of conductive wire. However, in some cases, it can be advantageous to independently control dispensing and retraction of wire from each reel. Accordingly, independently controlled motors associated with each wire wheel are also possible.

The ADCU can use communication parameter information received from the wireless communication device (or input by an operator) to determine the optimal characteristics of the antenna 300 for a particular communication session. Thereafter, the ADCU determines an optimal position for midpoint fixture 310 based on the optimal antenna characteristics. Control over the position of the UAV 302 is affected by means of the communication link 326 between the UAV and the ADCU. The midpoint fixture is carried aloft by the UAV so that the ends of the conductive radiating elements 304, 306 attached to the midpoint fixture are suspended in a controlled position above ground based on the optimal position. As noted above, the optimal position can be the same as the controlled position, but the two may be different in some scenarios due to practical considerations. If changes subsequently occur in one or more parameters associated with the communication session, the ADCU can identify new optimal antenna characteristics more suitable to such new communication conditions. Thereafter, the ADCU can cause the UAV to change the antenna characteristics so as to better suit the particular communication scenario. Such changes can involve modifying an altitude and/or position of the UAV relative to the two terminal end fixtures. In some scenarios, the user may need to also manually adjust a location where the halyards 314, 316 are secured to the ground (and/or the length of such halyards) to facilitate modification of certain antenna characteristics.

Figure 4:
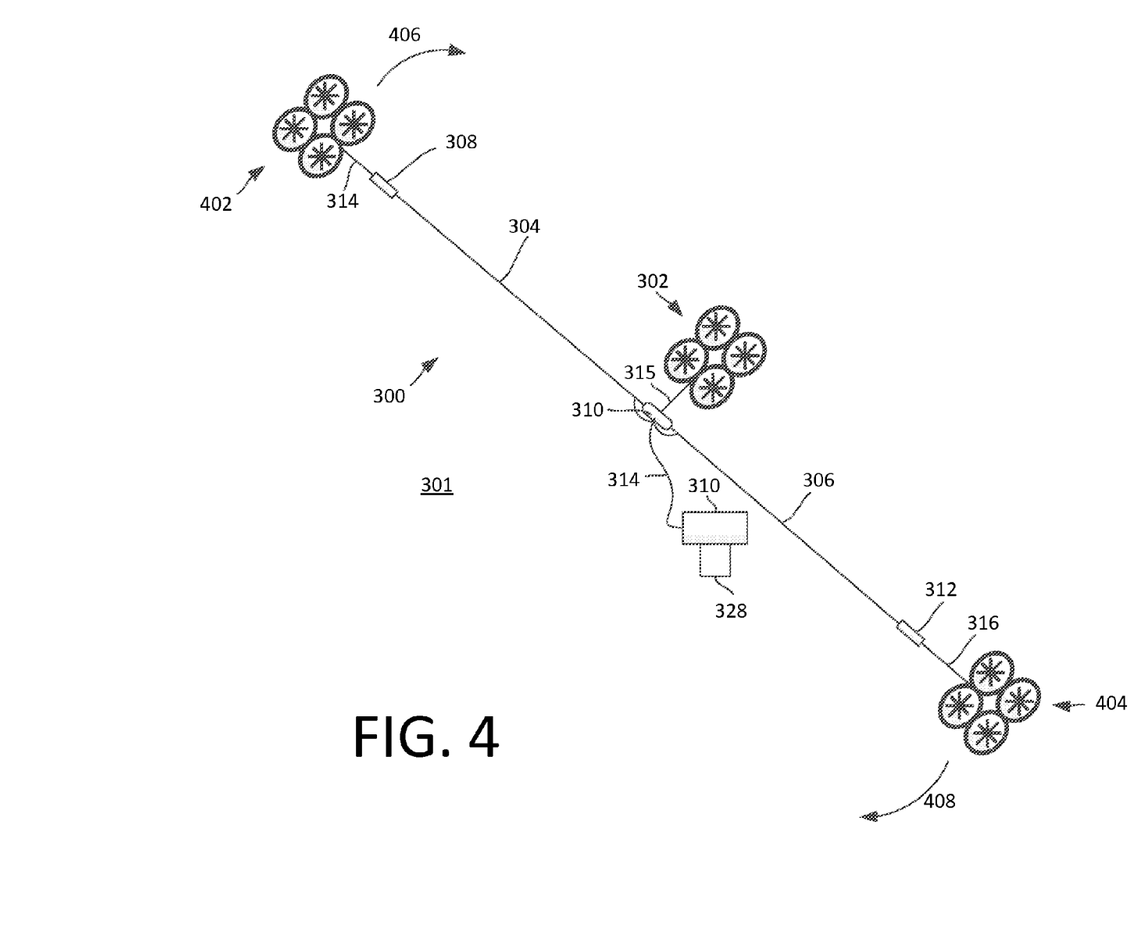
FIG. 4 is a drawing of fourth embodiment of an antenna deployment system for a dipole in a flat-top configuration that is useful for understanding the inventive arrangements.

From the foregoing it will be understood that the arrangement shown in FIG. 3 has many advantages but can still potentially require user manual operations to produce certain antenna characteristics. These limitations are avoided in a configuration shown in FIG. 4 in which all antenna characteristics can be dynamically varied automatically by the ADCU and a plurality of UAVs as shown. Referring now to FIG. 4, the dipole antenna 300 is shown in a configuration, in which the terminal end fixtures 308, 312 are carried aloft by UAVs 402, 404 rather than being secured to the ground. The height of the terminal end fixtures 308, 312 can thus be dynamically varied relative to the midpoint fixture 310 to provide a flattop configuration, an inverted V configuration, or any other desired variation in antenna geometry. The broadside direction of the antenna (transverse to the length of the dipole) can be adjusted by rotating the entire dipole in the directions indicated by arrows 406, 408. The arrangement shown in FIG. 4 offers a high degree of flexibility because almost every important characteristic of the antenna can be readily modified by controlling the positions of UAVs 302, 402, 404. Antenna characteristics that may be controlled include antenna impedance, azimuth direction of maximum gain, elevation direction of maximum gain, azimuth direction of maximum null, and elevation direction of maximum null. Further, if wire dispensing reels are provided at one or more of the midpoint fixture 310 and terminal fixtures 308, 312 then the electrical length characteristic of the antenna can also be adjusted as described above. Consequently, the resonant frequency and input impedance of the antenna can be dynamically adjusted automatically to suit a particular communication scenario. Likewise, the antenna electrical length can be selectively varied to form nulls and peaks in the resulting azimuth antenna pattern.

According to a further aspect, a position of one or more of the UAVs shown in FIG. 4 can be controlled so as to vary a dipole feed point. More particularly, by extending radiating element 304 to a different length as compared to radiating element 306, the antenna 300 can be re-configured to function as an off-center fed (OCF) dipole.

Figure 5:
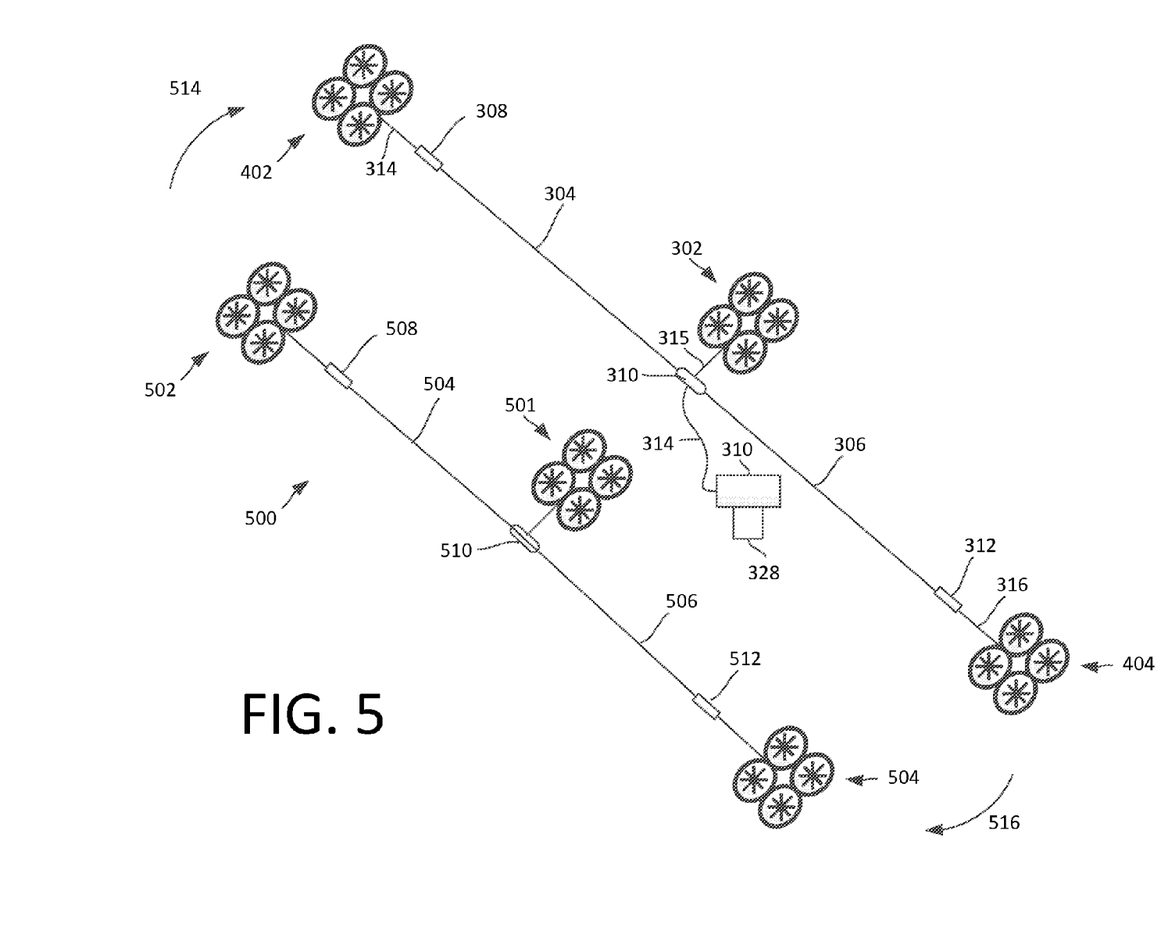
FIG. 5 is a drawing of fifth embodiment of an antenna deployment system for a multi-element antenna that is useful for understanding the inventive arrangements.

According to another aspect, the directional gain of a dipole antenna 300 can be enhanced by using a passive radiator or parasitic element, such as a reflector or director element. Such an arrangement is shown in FIG. 5, in which element 500 is used to increase radiation in a given direction. Element 500 can be similar to dipole 300 but since it is a passive element, the conductive portions 504, 506 would not be connected to the wireless communication device 310, and can instead be electrically connected to each other. In other respects, the design of element 500 can be similar and as such can include a midpoint fixture 510, and terminal fixtures 508, 512. The midpoint fixture and/or the terminal fixtures can include a wire dispensing reel as described herein. The element 500 can be supported by UAVs 501, 502, 504 which are under the control of the ADCU 328. As is known, the exact length of the element 500 will determine whether it functions as a director or reflector. A reflector will be about 5% longer than the dipole, whereas a director element will be about 5% shorter than the dipole. Adding a reflector to the dipole 300 can facilitate forming a 2-element Yagi, thereby increasing the gain of the overall system by about 5 dB over the dipole. More or fewer elements can be used in this way to increase antenna directivity. For directional control, the dipole 300 and the element 500 can be caused to rotate in unison as indicated by arrows 514, 516.

Figure 6:
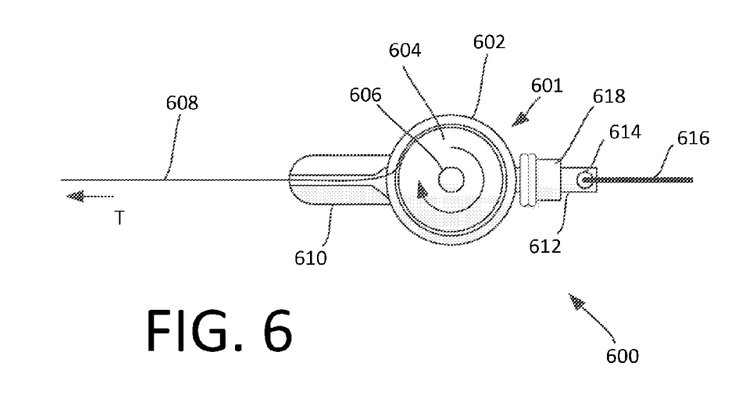
FIG. 6 is a drawing that is useful for understanding a wire antenna deployment reel which can be used in a terminal end fixture of an antenna.

A midpoint fixture and/or a terminal end fixture as described herein can be comprised of a conventional dielectric insulator. However, varying the electrical lengths of conductive radiator elements described herein is facilitated by a midpoint fixture or terminal end fixture that includes a wire reel capable of dispensing and retracting a conductive wire. Shown in FIG. 6 is an exemplary terminal end fixture 600 including a wire reel 601 for such purpose. The details of the reel are not critical; however, it will generally include a housing 602 in which is mounted a spool 604 on which conductive wire 608 can be wound. According to one aspect, the wire can be a non-insulated wire so that when wound about the spool, each coil of the wire is continuously electrically connected to all adjacent loops of wire. Consequently, the spooled wire does not appreciably add to the overall electrical length of the wire that has been dispensed from the reel. When the wire is used as a radiator element of an antenna, only the unspooled portion of the wire functions to adds to the electrical length of the radiator.

The spool can rotate about a central axial member 606 to facilitate winding and dispensing of the wire. A guide 610 can be provided to guide the wire onto the spool and aid with dispensing. A connecting member 612 is attached to the housing for securing the reel to a halyard, or to a second wire dispensing reel for dispensing wire in an opposing directions. In an exemplary embodiment, the connecting member can include an eyelet 614 to facilitate connection of the reel to a halyard 616. In order to electrically isolate the wire 608 from the connecting member, a dielectric insulator 618 can be interposed between the connecting member 612 and the housing 602.

Figure 7:
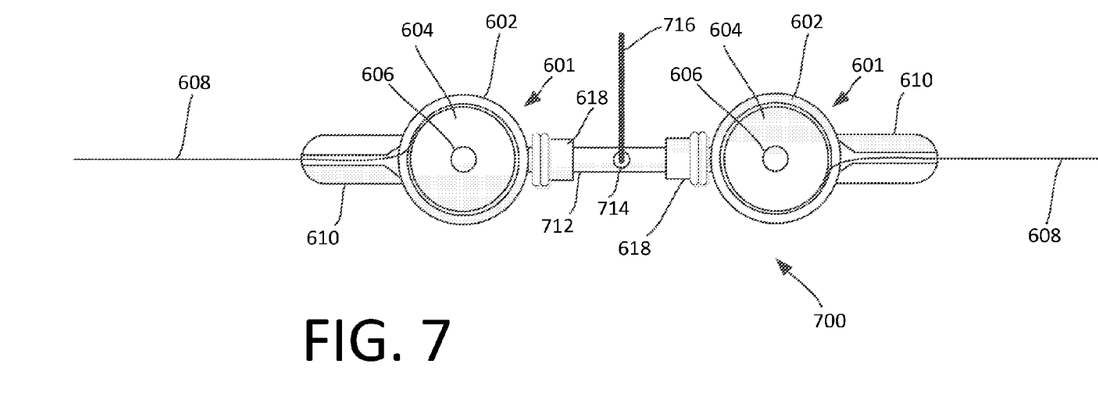
FIG. 7 is a drawing that is useful for understanding a wire antenna deployment reel which can be used in a midpoint fixture of an antenna.

Within the housing 602 a spiral wound torsion spring (not shown) can be mounted. The spring exerts a resilient spring force on the spool 604. This spring exerts a tension on the wire 608 when it is dispensed from the spool, but allows the spool to rotate. Accordingly, wire 608 is dispensed from the spool when a tension force T is exerted upon the wire. Conversely, the spring serves to retract and re-spool the wire when the tension force T upon the wire is removed or reduced below a predetermined level. With the foregoing arrangement the reel 600 can facilitate dispensing and retraction of wire automatically in response to a tension force applied by a UAV. A midpoint fixture 700 as shown in FIG. 7 can have a similar configuration to the terminal end fixture, but includes two of the reels 601 that are arranged to dispense wire in opposing directions as shown. The two reels are connected by a connecting member 712 and include an eyelet 714 through which a halyard 716 can be attached to secure the midpoint fixture to a UAV. Instead of (or in addition to the torsion spring), a motor could be added to each reel to facilitate spooling an unspooling of the wire.

As noted above, the ADCU can make use of one or more communication session parameters to select an optimal position for one or more defining points of the antenna. These communication session parameters can include a distance to a remote communication node, a direction of the remote communication node, a location of an electromagnetic interferer, an ionospheric condition, a measured antenna characteristic and a measured link parameter. If a measured antenna characteristic and/or a measured link parameter is used, the controlled position of one or more defining points of the antenna can be selectively varied by a UAV among a plurality of link-test positions which deviate in a predetermined way relative to the controlled position or the optimal position. At least one value can be measured at each of the link-test positions. For example a VSWR or input impedance parameter of the antenna can be measured. Alternatively, an RSSI, and/or a data error rate can be measure to determine if link quality has improved as a result of moving to any of the link-test positions. If a desirable improvement has been detected, the ADCU can modify the controlled position accordingly.

With a micro-UAV that has the capability to respond to position commands and stabilize itself with high precision (e.g., less than ½ meter in the x, y, and z axis), control and optimization of the antenna's electrical parameters could be achieved with preset geometries determined in accordance with an anticipated wireless communication session. Alternatively, the antenna geometries could be optimized in real-time while parameters like voltage standing wave ratio (VSWR), received signal strength indication (RSSI), and link quality are used as feedback. According to a further aspect, these parameters can be optimized in real time while an automatic link establishment (ALE) algorithm makes use of the continuously-adjustable antenna to achieve various communication goals.

An antenna deployment method and system as described herein has many advantages. It can be rapidly deployed and the impedance of the antenna can be adjusted by varying the geometry and height of the antenna above ground. The antenna could also be tuned for low VSWR at a particular frequency by "unreeling" antenna wire, to adjust antenna length. Further, antenna directional aiming can be provided for maximum gain of desired signal(s) in desired direction(s) by altering various antenna geometries. Transitions to alternate communication frequencies can be quickly effected by re-tuning the antenna in a matter of seconds. The geometry of the antenna can be changed in moments to selectively vary the direction of maximum gain to one or more intended receivers. Each adjustment can advantageously be effected quickly, in real time, using GPS position reports to determine relative bearings to each intended receiver.

With the inventive arrangements, antenna aiming can be used for improving signal strength of a desired signal or to null out an interferer. Moreover, elevation and azimuth patterns can be dynamically optimized for use on a specific frequency. For example, elevation adjustments of the antenna can be made quickly to achieve a peak gain lobe for a particular take-off angle for a particular long-distance intended communication link. A further advantage of the methods and systems described herein is that lower transmit power requirements are facilitated by optimizing antenna gain for a particular communication link. This feature of the invention has the potential to facilitate longer battery life, or lower weight batteries, in a portable communication device because communication power requirements are reduced.

The methods and systems described herein can be generalized to multiple element antennas, where the support of each element is provided by a micro-UAV. For example, multi-element Yagi antennas are very effective in achieving higher gain and directional performance, but at the low-HF frequencies are physically large and not practical for a tactical operator with a standard fixed element design. For purposes of the present invention, each element can be individually moveable and deployable using a network of micro-UAVs to deploy, raise to a specified height, and then aim the antenna. Continuous feedback could be used to adjust in real-time any of the geometric parameters of the antenna.

The present invention can be realized in a computer system. Alternatively, the present invention can be realized in two or more interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. Such computer program can include antenna modeling software to facilitate selection of optimal antenna characteristics for a particular set of conditions and available antenna hardware.

Figure 8:
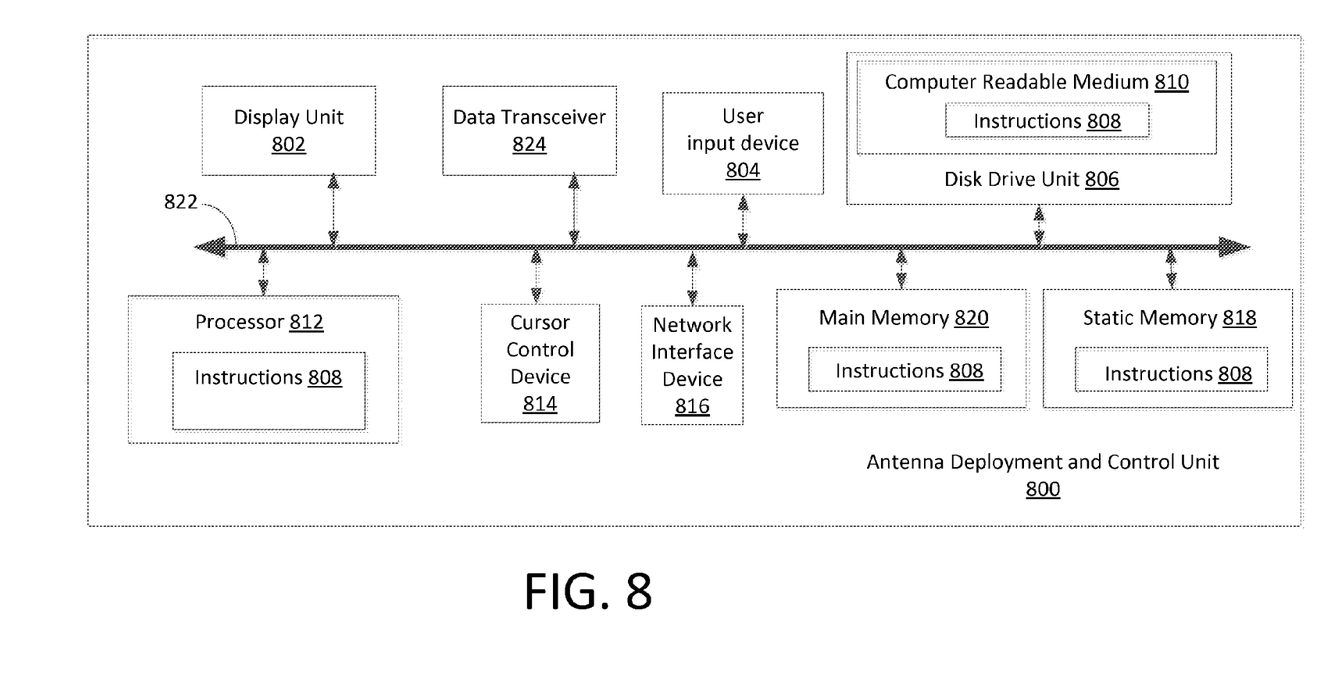
FIG. 8 is a block diagram that is useful for understanding an architecture of an antenna deployment control unit.

Referring now to FIG. 8, an exemplary ADCU 800 includes a processor 812 (such as a central processing unit (CPU). In some embodiments, the ADCU may be integrated into a wireless communication device (e.g., wireless communication device 110, 310) but for convenience it is shown in FIG. 8 as a separate unit. The ADCU can include a disk drive unit 806, a main memory 820 and a static memory 818, which communicate with each other via a bus 822. The computer system 800 can further include a display unit 802, such as a video display (e.g., a liquid crystal display or LCD), a flat panel, a solid state display, or a cathode ray tube (CRT)). The computer system 800 can include a user input device 804 (e.g., a keyboard), a cursor control device 814 (e.g., a mouse) and a network interface device 816. In the various embodiments a network interface device 816 can be used to communicate with a wireless communication device for receiving information, such as one or more communication parameters associated with a wireless communication session. A data transceiver 824 can be provided for local wired or wireless communication with one or more UAVs. If a wireless communication link is used for this purpose, it can be optionally configured to utilize a wireless link in conformance with a wireless local area network standard such as IEEE 802.11.

The disk drive unit 806 includes a computer-readable storage medium 810 on which is stored one or more sets of instructions 808 (e.g., software code) configured to implement one or more of the methodologies, procedures, or functions described herein. The instructions 808 can also reside, completely or at least partially, within the main memory 820, the static memory 818, and/or within the processor 812 during execution thereof by the computer system. The main memory 820 and the processor 812 also can constitute machine-readable media.

Those skilled in the art will appreciate that the system architecture illustrated in FIG. 8 is one possible example of a computer system that can be used to implement and ADCU. However, the invention is not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Figure 9:
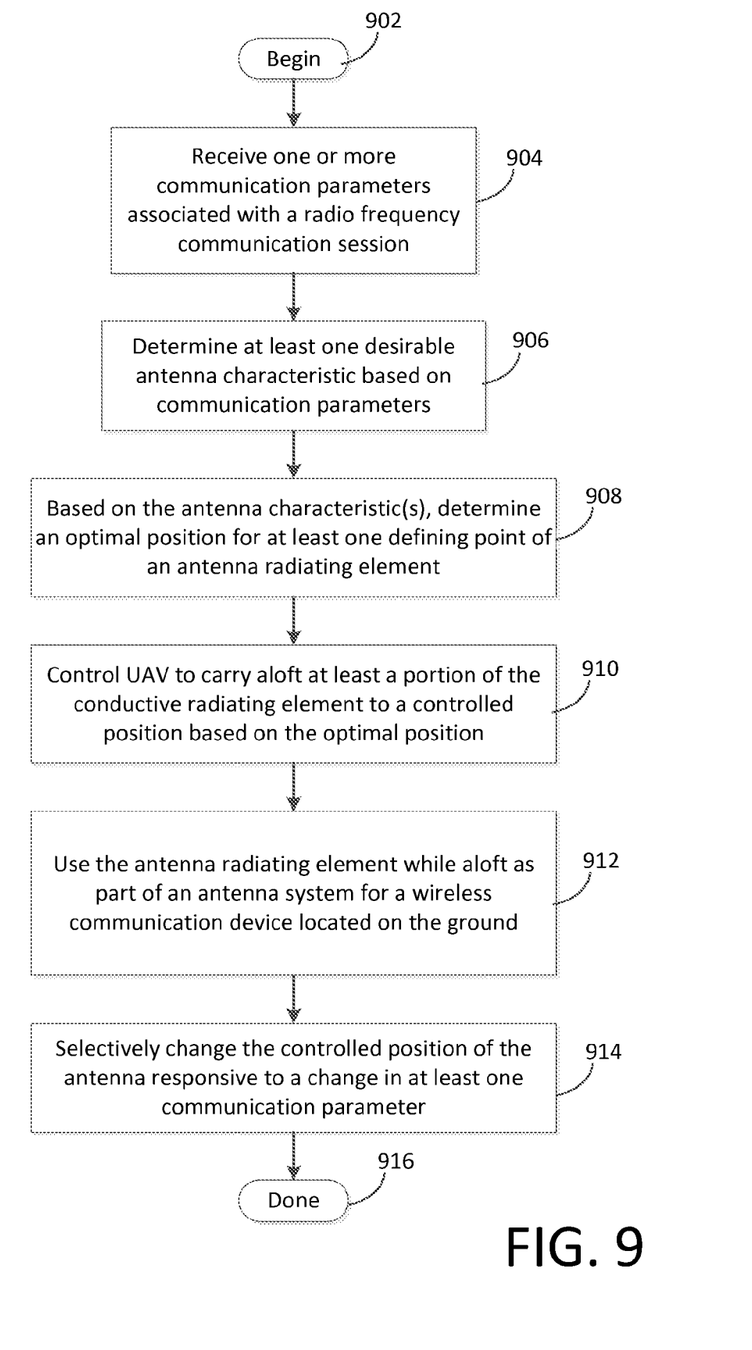
FIG. 9 is a flowchart that is useful for understanding an antenna deployment and control process.

Referring now to FIG. 9, there is shown a flowchart that is useful for understanding a method for automatically deploying and controlling an antenna system as described herein. The method begins at 902 and continues to 904 where an ADCU receives one or more communication parameters associated with a radio frequency communication session. These parameters may be input manually, may be received from a wireless communication device based on one or more settings for a communication session, or can be determined based on link measurements. Thereafter, in step 906, at least one desirable antenna characteristic is determined based on the one or more communication parameters. Thereafter, the ADCU determines at 908 an optimal position of at least one defining point of an antenna radiating elements based on the desired antenna characteristic(s). In step 910, the ADCU controls a UAV to carry aloft at least a portion of the conductive radiating element to a controlled position based on the optimal position. Once positioned in this way, a wireless communication device located on the ground (and connected to the antenna) can use the antenna at 912 to transmit and/or receive radio signals. In optional step 914, the controlled position of the antenna can be dynamically selectively modified by the ADCU in response to a change in at least one communication parameter which has been selected or measured. The process can thereafter continue or can end at step 916.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

I claim:

1. A method for deploying an antenna, comprising
   determining at least one antenna characteristic that is desirable for a radio frequency communication session;
   based on the at least one antenna characteristic, determining an optimal position for at least one defining point of at least one conductive radiating element;
   electrically coupling said conductive radiating element to a wireless communication device;
   using an antenna deployment control unit (ADCU) comprising an electronic computer processor device to cause an unmanned aerial vehicle to carry aloft at least a portion of the conductive radiating element to a controlled position above ground based on the optimal position;
   using the conductive radiating element to form at least part of an antenna for the wireless communication device; and
   conducting the radio frequency communication session while the conductive radiating element is suspended in the air by the unmanned aerial vehicle, and while the wireless communication device is disposed on the ground.

2. The method according to claim 1, further comprising using the ADCU to automatically control the unmanned aerial vehicle to establish and maintain the controlled position after the optimal position has been determined.

3. The method according to claim 2, further comprising using the ADCU to automatically identify a second optimal position responsive to a change in at least one communication parameter associated with the radio frequency communication session.

4. The method according to claim 3, further comprising using the ADCU to automatically dynamically vary the position of the unmanned aerial vehicle to a second controlled position responsive to determining the second optimal position.

5. The method according to claim 1, further comprising using the ADCU to automatically determine the at least one antenna characteristic based on one or more communication session parameters associated with the radio frequency communication session.

6. The method according to claim 5, wherein the communication session parameters are selected from the group consisting of a distance to a remote communication node, a direction of the remote communication node, a location of an electromagnetic interferer, an ionospheric condition, and a measured link parameter.

7. The method according to claim 5, wherein the at least one antenna characteristic is selected from the group consisting of electrical length, antenna impedance, azimuth direction of maximum gain, elevation direction of maximum gain, azimuth direction of maximum null, and elevation direction of maximum null.

8. The method according to claim 1, wherein the antenna is comprised of a plurality of radiating elements, and further comprising determining an optimal position of a plurality of said defining points for the radiating elements.

9. The method according to claim 8, further comprising using a plurality of the unmanned aerial vehicles controlled by the ADCU to carry at least a portion of each conductive radiating element aloft to a respective controlled position, wherein the controlled positions are based on the optimal positions.

10. The method according to claim 1, further comprising responsive to determining a change in at least one communication parameter associated with the communication session, automatically determining a modified value for the at least one antenna characteristic.

11. The method according to claim 10, further comprising determining with the ADCU a second optimal position for the at least one defining point based on the modified value.

12. The method according to claim 11, further comprising using the ADCU to automatically cause the unmanned aerial vehicle to move the portion of the conductive radiating element to a second controlled position based on the second optimal position.

13. The method according to claim 12, further comprising selectively varying an effective electrical length of the conductive radiating element when transitioning said unmanned aerial vehicle from the controlled position to the second controlled position under the control of the ADCU by automatically retractably deploying said conductive radiating element from a reel carried aloft on said unmanned aerial vehicle.

14. The method according to claim 1, further comprising;
using the ADCU to cause the unmanned aerial vehicle to selectively vary said controlled position among a plurality of link-test positions which deviate in a predetermined manner relative to the controlled position; and
measuring at least one communication parameter at each of the link-test positions.

15. The method according to claim 14, further comprising using the ADCU to selectively change the controlled position to one of the plurality of link-test positions if an improvement in at least one communication parameter is detected at the link-test position.

16. The method according to claim 1, wherein the optimal position is further determined by the ADCU based on at least one of an operating limitation of the unmanned aerial vehicle, an antenna feed line length, and a selected antenna configuration.

17. The method according to claim 1, further comprising selectively controlling an effective electrical length of the conductive radiating element when deploying said unmanned aerial vehicle to the controlled position by automatically retractably deploying said conductive radiating element from a reel.

18. The method according to claim 1, wherein the unmanned aerial vehicle carries aloft to the controlled position the portion of the conductive radiating element that is directly connected to a center insulating element, and the antenna further comprises a second conductive radiating element which is also attached to the center insulating element.

19. The method according to claim 18, further comprising securing to the ground an end of each conductive radiating element opposed from the center insulating element so that the ends are spaced a distance apart to define an inverted V antenna configuration.

20. The method according to claim 18, further comprising carrying aloft to second and third controlled positions above ground an end of each conductive radiating element opposed from the center insulating element.

21. The method according to claim 20, wherein the second and third controlled positions are based on second and third optimal positions chosen for providing the at least one antenna characteristic, and the ADCU controls a second and third unmanned aerial vehicle to respectively position the end of each conductive radiating element opposed from the center insulating element at the second and third optimal positions.

22. The method according to claim 1, further comprising electrically coupling the conductive radiating element to the wireless communication device using an antenna feed line.

23. The method according to claim 1, wherein the optimal position includes at least one of a geographic position and an optimal altitude.

24. A method for deploying an antenna, comprising
selectively determining an optimal position for at least one defining point of an antenna based on one or more parameters associated with a wireless communication session;
responsive to said determining, using an unmanned aerial vehicle under the control of a computer processing device to selectively cause the unmanned aerial vehicle to automatically suspend at least one portion of the antenna aloft in a controlled position based on the optimal position;
coupling the antenna to a wireless communication device; and
using the antenna while aloft to conduct the wireless communication session while the wireless communication device is disposed on the ground.

25. A radio transceiver system, comprising
a wireless communication device;
an antenna for the wireless communication device including at least one conductive radiating element;
an antenna feed line connecting the wireless communication device to the at least one conductive radiating element;
an antenna deployment control unit coupled to the wireless communication device which
automatically determines based on at least one communication parameter associated with the wireless communication session, an optimal position for at least one defining point of the at least one conductive radiating element; and
selectively controls an unmanned aerial vehicle to carry aloft at least a portion of the conductive radiating element to a controlled position above ground based on the optimal position.

* * * * *